Dec. 12, 1939.　　　D. D. WILE　　　2,183,207

VALVE STRUCTURE

Filed May 2, 1936

INVENTOR
Daniel D. Wile
BY Andrew K. Foulds
his ATTORNEY

Patented Dec. 12, 1939

2,183,207

UNITED STATES PATENT OFFICE 2,183,207

VALVE STRUCTURE

Daniel D. Wile, Detroit, Mich., assignor to Detroit Lubricator Company, Detroit, Mich., a corporation of Michigan Application May 2, 1936, Serial No. 77,485

8 Claims. (Cl. 251—44)

My invention relates to new and useful improvements in valves, and more particularly to the cooperative relation between a valve member and its seat. In needle type valves, particularly when automatically actuated such as in refrigeration expansion valves, it is highly desirable that the valve member should have uniform engagement circumferentially with its seat and that the valve member should be free to assume such a position upon initial engagement with its seat and should then be held in such adjusted position for all subsequent valve seating operations. It is therefore one of my objects to provide a valve in which the needle will seat accurately and repeatedly in the same position relative to its seat.

Another object is to provide a valve in which the valve member is so supported that it will seat uniformly on initial engagement with its seat member and will be held in such position for subsequent operations.

The invention consists in the improved valve and its cooperative parts, to be more fully described hereinafter and the novelty of which will be particularly pointed out and distinctly claimed.

In the accompanying drawing, to be taken as a part of this specification, I have fully and clearly illustrated a preferred embodiment of my invention, in which drawing—

Figure 1:
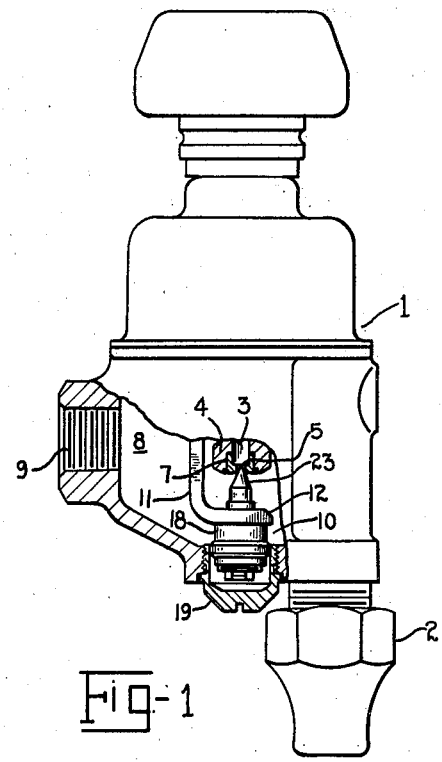
Figure 1 is a view in side elevation and partially in vertical central section of a refrigerant expansion valve embodying my invention.
Figure 2:
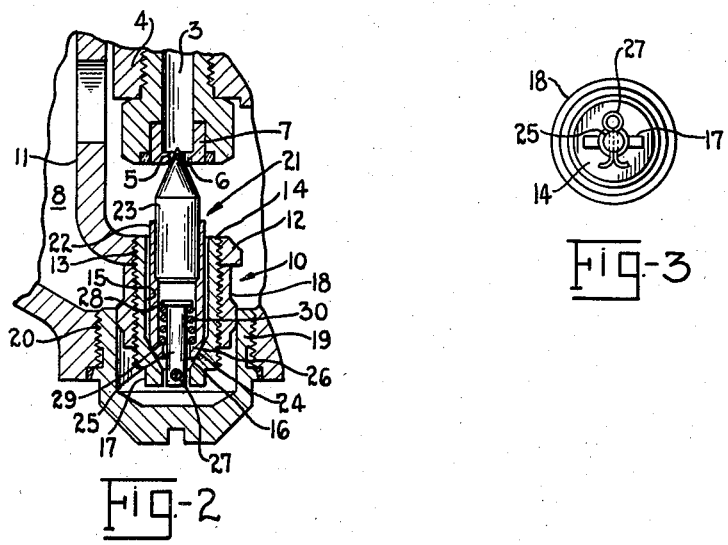
Fig. 2 is an enlarged detail view in vertical central section through the valve structure showing the mounting of the valve member.
Figure 3:
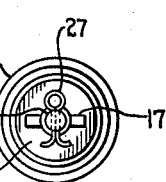
Fig. 3 is a detail end view of the valve member supporting means.

Referring to the drawing by characters of reference, 1 designates generally a valve casing having an inlet connection 2 opening into an inlet passageway 3 in a body member 4. The passageway 3 terminates in a valve port 5 which provides a downward facing valve seat 6 in a valve seat member 7. Within the valve chamber 8 which has an outlet 9 there is a valve carrier 10 supported by an operating arm 11. The end of the arm 11 is preferably bent or turned, as at 12, to lie in opposing relation to the port 5 and has a screw-threaded aperture 13 into which is threaded a tubular supporting member 14. The aperture 13 is aligned with the port 5 and the member 14 extends from the side face of arm portion 12 opposite the member 4. The bore 15 of member 14 provides an elongated cylindrical socket opening through the arm member portion 12 and in alignment with the port 5. The wall of bore 15 is provided adjacent the lower end of member 14 with a converging, substantially conical portion 16 which also faces toward the port 5. The lower end of member 14 terminates in a cross rib 17 for engagement by a tool to screw the member into the aperture 13. Surrounding the member 14 there is a guide sleeve 18 which reciprocally fits within a guide member 19 preferably in the form of a hollow plug which closes and seals an aperture 20 in the casing wall and which on removal permits access to the interior of the casing for assembly of the valve structure. Positioned within the bore 15 there is a valve member 21 comprising a valve sleeve or holder 22 and a needle valve 23 which is rigidly fixed in the bore of the sleeve 22. The external diameter of sleeve 22 is of less dimension than the internal diameter of member 14 so that the valve member 21 fits loosely within the bore 15 and can move laterally therein. The lower or inner end portion of sleeve 22 which seats on the converging wall portion 16 is externally rounded or convexly curved, as at 24, so that the member 21 can have universal movement within the bore 15 and on the wall portion 16. A post or anchoring member 25 extends into the bore 15 toward the port 5 and through an aperture or opening 26 in the bottom or inner end of sleeve 22. A cross pin 27 extending through the post 25 engages the bottom end face of member 14 and limits the movement of the post into the sleeve 22. The end of the post which is within the sleeve 22 terminates in a flange or head 28 which lies in opposed relation to an internal shoulder 29 in the bore of sleeve 22. Within the sleeve 22 and positioned between the flange 28 and shoulder 29, there is a helical coil spring 30 which surrounds the post 25 and is held under compression to urge the convex portion 24 into frictional engagement with the converging wall portion 16.

In operation, the supporting member 14 will be guided accurately and uniformly without change in lateral position toward and from the port 5 by reason of the guide means 19. When the needle valve 23 initially moves to its seat, the seat 6 as the end of valve 23 enters port 5, will tilt or rock the valve member 21 at its universal engagement between surfaces 24 and 16 to cause the needle valve to engage the seat uniformly and accurately. The spring 30 will permit the valve member 21 to move relative to supporting member 14 as the valve member comes to its seat and upon retraction of the valve member to open the port, the spring 30 will frictionally hold the valve member 21 in its adjusted position. The frictional engagement between surfaces 24 and 16 under the force of spring 30 will also prevent rotation of the valve member 21 so that there will be no variation in contact between the surface portion of the needle 23 and the seat 6 which come into engagement with each other.

What I claim and desire to secure by Letters Patent of the United States is:

1. In a valve structure, a member having a port, a valve carrier movable toward and from said port and having a socket facing said port, a valve member having a hollow portion and being laterally movable in and extending from said socket, said socket being elongated so that said valve member is limited in its lateral movement by the side walls of said socket, a converging internal wall portion at the inner end of said socket and facing said port, the inner end portion of said valve member engaging said wall portion and being constructed and arranged for universal movement relative to said valve carrier, a spring carried within and by said valve member, and means to transmit the force of said spring to said valve carrier so that said spring holds said inner end portion of said valve member in frictional engagement with said wall portion, regardless of the relative positions of said valve carrier and said port.

2. In a valve structure, a member having a port, a valve carrier movable toward and from said port and having a socket facing said port, a valve member laterally movable in and extending from said socket, said socket having a converging internal wall portion facing said port, the inner end portion of said valve member being hollow and engaging said wall portion for universal movement, the inner end of said valve member having an opening, a member secured to said carrier and extending through said opening, and a spring within said valve member, said spring acting on said last-named member and said valve member to hold said inner end portion of said valve member in frictional engagement with said wall portion.

3. In a valve structure, a member having a port, a valve carrier movable toward and from said port and having a socket facing said port, a valve member laterally movable in and extending from said socket, said socket having a converging internal wall portion facing said port, the inner end portion of said valve member engaging said wall portion for universal movement, the inner end of said valve member having an opening, a post secured to said carrier and extending through said opening, a flange on said post within said valve member, and a coil spring surrounding said post and acting between said flange and said valve member to hold said valve member in frictional engagement with said wall portion.

4. In a valve structure, a member having a port, an operating arm, a tubular supporting member carried by said arm and having its bore opening through said arm and aligned with said port, a post secured to said supporting member and extending longitudinally of said bore toward said port, said supporting member having a converging internal wall portion facing said port and surrounding said post, a sleeve member having an internal shoulder facing said port and receiving said post, said post having a flange within said sleeve member, said sleeve member being loosely positioned in said bore for lateral movement and having a rounded end portion seating on said wall portion, a coil spring surrounding said post and held under compression between said flange and said shoulder to hold said rounded portion in frictional engagement with said wall portion, and a needle valve secured in said sleeve member and cooperable with said port.

5. In a valve structure, a valve supporting member having a socket, an annular internal bearing surface within said socket, a valve member having a hollow portion and positioned in said socket and having a bearing surface so engaging with said annular surface that said valve member is movable in said socket, and resilient means carried within said valve member and urging said surfaces into frictional engagement regardless of the position of said supporting member so that said valve member will be retained in set position.

6. In a valve structure, a valve supporting member having a socket, an annular internal bearing surface within said socket, a valve member positioned in said socket and having a bearing surface engageable with said annular surface so that said valve member is movable in said socket, the inner end portion of said valve member being recessed, a retaining member on said supporting member and extending toward said valve member recess, and a spring in said recess and engaging said retaining member and said valve member to urge said surfaces into frictional engagement so that said valve member will be retained in set position.

7. In a valve structure, a supporting member having a bore therethrough with an annular internal shoulder, a sleeve member positioned in said bore and seating on said shoulder, said sleeve member and said shoulder having cooperable bearing surfaces such that said sleeve member is universally adjustable, a post extending into said bore and said sleeve member, means to limit the extent of admission of said post into said bore, said post having a lateral projection within said sleeve member, a coil spring within said sleeve member and held under compression between said lateral projection and said sleeve member such that said spring urges said surfaces into frictional engagement, and a valve member carried by and projecting from said sleeve member.

8. In a valve structure, a valve supporting member having a socket, an annular converging bearing surface within said socket, a valve member positioned in said socket and having a bearing surface engageable with said annular surface so that said valve member is universally movable in said socket, said valve member having an internal shoulder, and resilient means engaging said shoulder and urging said surfaces into frictional engagement so that said valve member will be retained in set position regardless of the position of said supporting member.

DANIEL D. WILE.